May 12, 1959  B. E. CLAGG  2,885,815
FISHING TACKLE
Filed Oct. 8, 1954
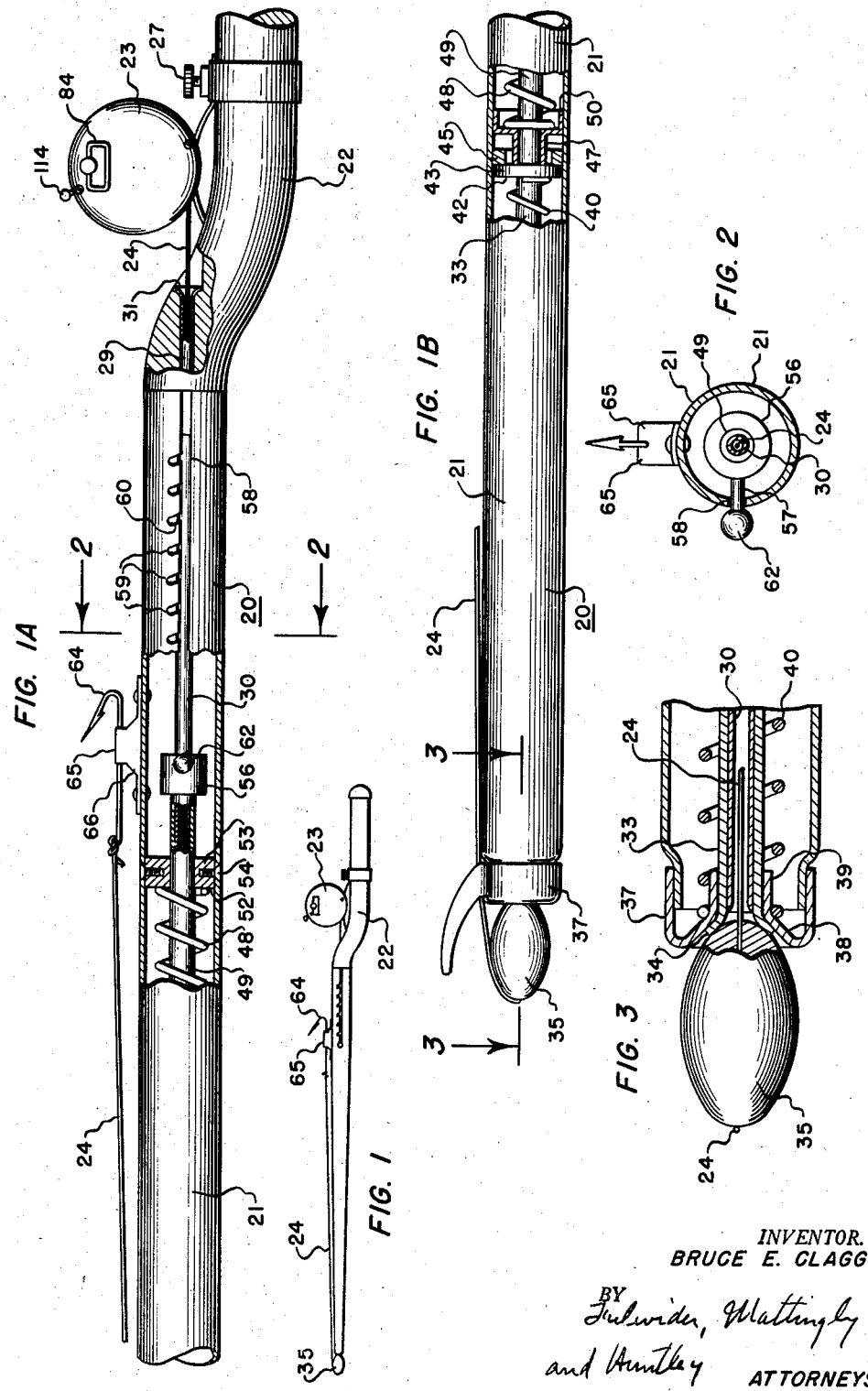
INVENTOR.
BRUCE E. CLAGG
BY
Fulwider, Mattingly
and Huntley  ATTORNEYS United States Patent Office
2,885,815
Patented May 12, 1959

2,885,815
FISHING TACKLE
Bruce E. Clagg, Escondido, Calif.

Application October 8, 1954, Serial No. 461,225

4 Claims. (Cl. 43—19)

The present invention relates to fishing tackle and more particularly to a fishing pole for the fishing line.

One of the objects is to provide a fishing pole with mechanism for imparting a decisive blow to a fishing line weight whereby the weight and the line are projected in a desired direction and to a desired distance.

In carrying out the foregoing object, it is a further object of the present invention to provide a hollow or tubular fishing pole with tubular means within the pole, through which latter the fishing line is threaded. This tubular means includes an inner tube having a seat, at the forward end thereof, against which the weight or sinker rests, and this tube is movable longitudinally with respect to and independently of the outer tube. Mechanism is provided for imparting a decisive blow to the inner tube so as to project the weight and the line attached thereto in the direction at which the pole is pointed.

Further objects and advantages will be apparent from the following description, reference being had to the accompanying drawings wherein a preferred embodiment of the invention is illustrated.

In the drawings:

Fig. 1 is a side elevational view of my fishing pole, showing a tapered pole;

Fig. 1A is a view partly in section, showing a rear portion of the fishing pole;

Fig. 1B is a view of the fore part of the fishing pole, and is an extension of Fig. 1A;

Fig. 2 is a sectional view taken on line 2—2 of Fig. 1A; and

Fig. 3 is a partial sectional view taken on line 3—3 of Fig. 1B, but on a somewhat larger scale.

Referring first to the sheet showing the fishing pole, the pole is generally indicated at 20, including an elongated tube 21, a handle 22 suitably secured to the rear end of the tube 21. The upper side of the handle 22 carries a reel 23 for a fishing line 24. The reel may be held in place in any suitable manner as, for example, the forward part of the shank 26 can extend into a slot (not shown) in the handle of the pole, and the rear portion of the shank held in place by a screw 27. Tubular means extends throughout the length of the outer tube 21 including a tube section 29 in the handle 22 and a tube 30 suitably supported by the forward part of the handle.

The rear portion of the tube section 29 is flared as at 31. The line 24 extends through this tubular means and the flare 31 is provided for preventing any rough edge of the tube from wearing the line. The tube 30 extends substantially throughout the length of the outer tube 21 and at the front end thereof it slidably carries a tube 33. The outer end of this tube 33 is flared as at 34 to form a seat for a weight 35, which weight is suitably attached to the line 24.

The outer end of the tube 21 carries a cap 37. This cap is provided with an inwardly and rearwardly extending cone-shaped portion 38, which forms a seat for the rear side of the flare portion 34 of tube 33.

A tubular portion 39 forms an extension of the cone-shaped portion 38. This tubular portion 39 forms a guide for the forward end of tube 33. A coil spring 40 surrounds this tubular portion 39, the forward end of the spring abutting the cone-shaped portion 38. This coil spring 40 also surrounds the tube 33 and the rear end thereof abuts against a shoulder 42 on said tube 33. Thus the spring 40 normally yieldingly urges the tube 33 rearwardly, whereby the flared end 34 thereof rests upon the seat 38 formed by the cone of the cap 37. The shoulder 42 is formed by a collar 43 secured to the rear end of the tube 33. A stop in the form of a ring 45 is secured on the inside of the outer tube 21; the collar 43 is arranged to engage this stop and thus the extent of rearward movement of the tube 33 is limited.

By imparting a decisive blow to the rear side of the tube 33, it will be projected forwardly with such force as to project the weight 35, and the line carried thereby, forwardly. Any suitable mechanism may be employed for imparting the blow to the rear side of the collar 43. The mechanism I prefer comprises a collar 47 which is spring-loaded through a spring 48.

This collar 47 is suitably secured to a tube 49, and tube 49 encircles tube 30, the tube 30 providing a guide or a bearing for the tube 49. The collar 47 is also flared outwardly rearwardly as at 50, and also provides a guide for the tube 49. The rear end of the spring 48 abuts a shoulder 52 in the form of a collar 53, which also forms a guide for the tube 49. The collars 45 and 53 may be held in place in any suitable manner as by screws 54. The spring 48 is under compression and normally urges the collar 47 forwardly to impart the blow to the collar 43 on the tube 33; the spring 48 is further compressed as by pulling rearwardly on the tube 49 and consequently rearwardly on the collar 47. Then, after the compression of the spring has attained that desired, the tube 49 is released and the spring 48 will then drive the tube 49 and the collar 47 forwardly to impart the blow to the collar 43. The tension of springs 40 and 48 may be such that when the parts are in the position shown in Fig. 1B, the compression of the spring 40 slightly overcomes the compression of spring 48, whereby the collar 42 normally rests upon the stop 45 and consequently the flare 34, at the forward end of the tube 33, rests upon its seat 38. However, the momentum of the spring 48, tube 49, and collar 47 is sufficient to overcome any compression of spring 40 when the compression of spring 48 is released.

The force of the blow imparted by the collar 47 to the tube 33 can be controlled and regulated, whereby the distance to which the weight and line is projected can be controlled. To accomplish this, the rear end of the tube 49 has attached thereto a collar 56. This collar carries a pin 57 which extends through a slot 58 in the side of the outer tube 21. A plurality of slots 59 open into the slot 58 and extend slightly forwardly to provide shoulders 60. The outer end of the pin 57 carries a handle 62. To load the spring 48, the handle 62 is pulled rearwardly to further compress the spring 48, and then it is rotated clockwise into one of the slots 59, and due to the angle of the shoulder 60, spring 48 normally holds the pin in the latched position. To release the spring, the handle 62 is merely moved in a downward direction out of the slot 59. It will be understood that the further rearwardly the tube 49 is moved, the greater will be the impact of collar 47 on the tube 33. Thus, by selecting the desired slot 59 for the pin 57, the distance at which the weight and line are projected can be controlled.

The end of the line 24 carries the usual hook 64 which may be frictionally held in position on the top of the pole by tines 65 of a block 66 of resilient material.

Preferably, for the purpose of increased limberness, the outer tube 21 is tapered as shown in Fig. 1, however, for the sake of simplicity, I have shown said tube as having a constant diameter throughout the length thereof. In either aspect, I have provided a fishing pole comprising concentric and coextensive tubes. The tubes may be formed of any suitable light weight and resilient material, for example plastic, spun glass, or metal tubing. These tubes may be of relatively thin material, insufficient in themselves individually to withstand the bending strains to which they are apt to be subjected while fishing, yet together, in concentric relationship providing the necessary strength ordinarily encountered while fishing and providing sufficient limberness or resiliency.

While the form of embodiment herein shown and described constitutes a preferred form, it is to be understood that other forms may be adopted falling within the scope of the claims that follow:

I claim:

1. In a fishing pole, a line projector comprising in combination an elongated outer tube; elongated tubular means within the outer tube and substantially coextensive with the outer tube, said tubular means including a second longitudinally movable tube extending rearwardly from adjacent the front end of the outer tube to a point intermediate the ends of the same and having a shoulder at the front end thereof forming a seat for a line weight, which weight is adapted to be attached to a line, said tubular means including a third tube extending forwardly from adjacent the rear of the outer tube to a point adjacent the forward end of the same through the second mentioned tube, said second and third-mentioned tubes having coaxial relationship with one another, said line being adapted to extend through the tubular means; and means for imparting a forwardly directed blow to the second-mentioned tube whereby to cause the same to eject the weight and the line attached thereto.

2. A device as defined in claim 1, characterized in that means is provided for normally yieldingly urging the second-mentioned tube rearwardly.

3. A device as defined in claim 1, characterized in that the shoulder, forming the seat on the second-mentioned tube, is adjacent the forward end of said tube and that the blow-imparting means imparts the blow to the rear end of the said tube.

4. A device as defined in claim 1, characterized in that the shoulder, forming the seat on the second-mentioned tube, is adjacent the forward end of said tube and that the blow-imparting means imparts the blow to the rear end of the said tube; and further characterized in that the blow-imparting means includes a coil spring encircling the third-mentioned tube.

References Cited in the file of this patent

UNITED STATES PATENTS

| | | |
|---|---|---|
| 390,752 | Cashin | Oct. 9, 1888 |
| 497,341 | Porter | May 16, 1893 |
| 1,054,916 | Gray | Mar. 4, 1913 |
| 2,305,176 | Littman | Dec. 15, 1942 |
| 2,584,678 | Dewey | Feb. 5, 1952 |
| 2,671,289 | McCullough | Mar. 9, 1954 |

FOREIGN PATENTS

| | | |
|---|---|---|
| 659,718 | Great Britain | Oct. 24, 1951 |